UNITED STATES PATENT OFFICE.

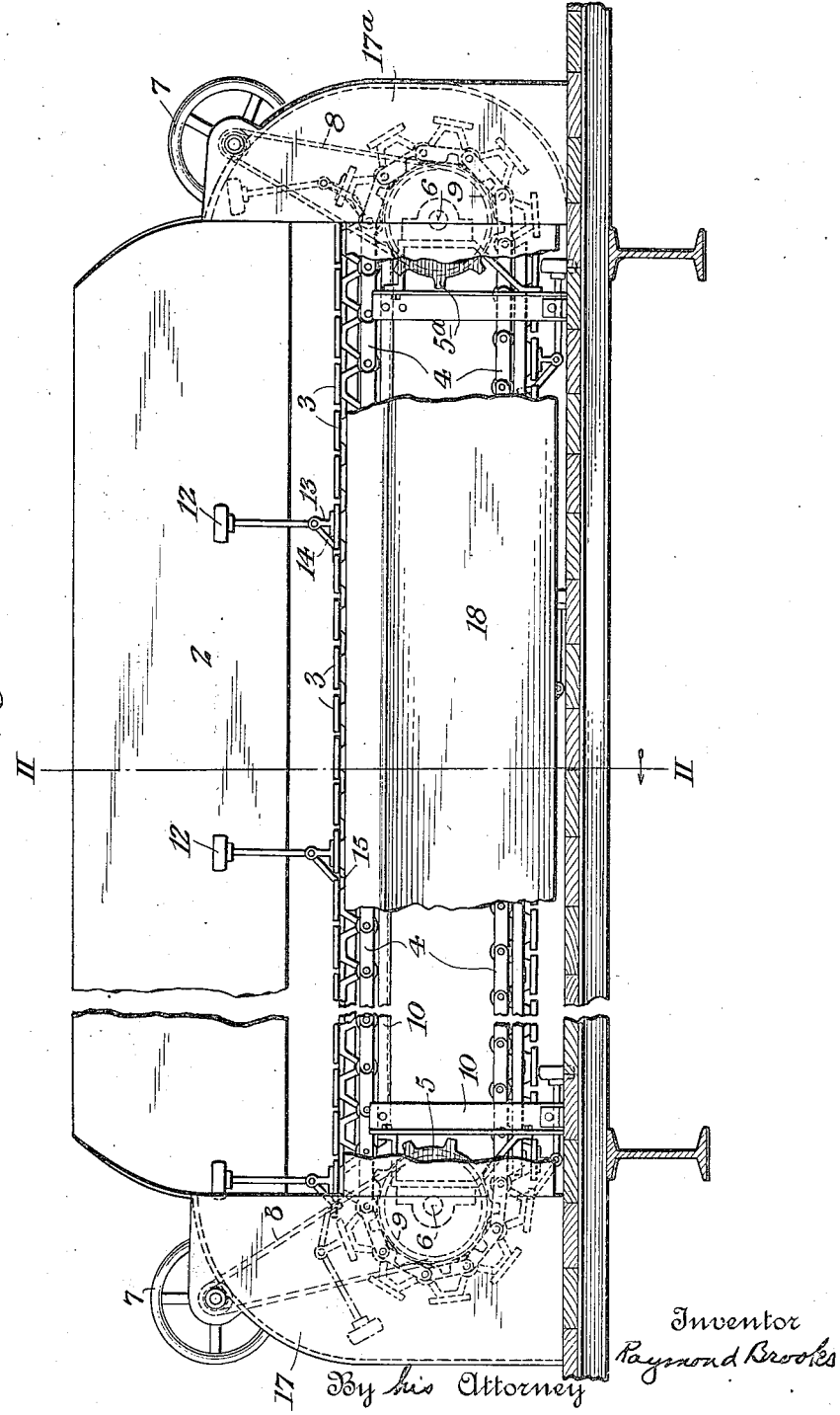

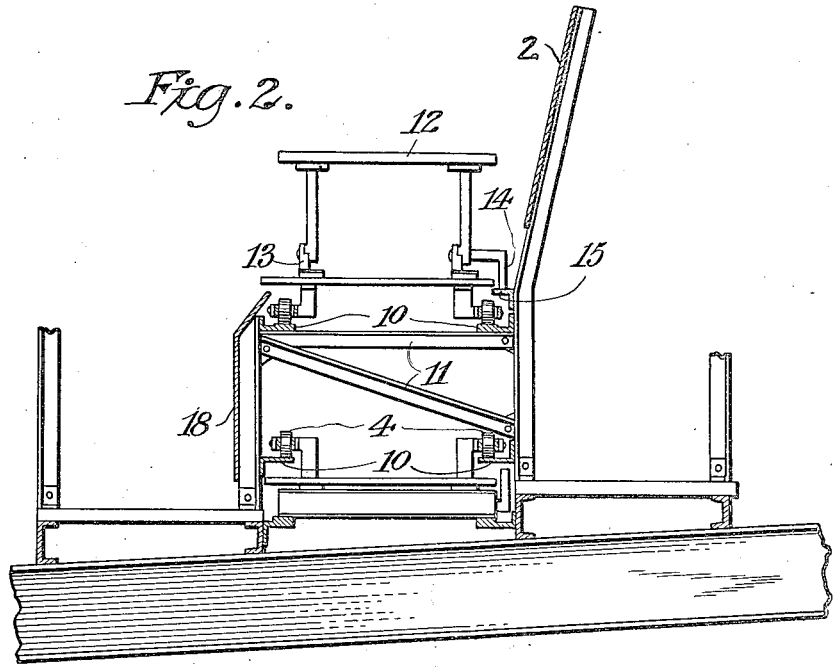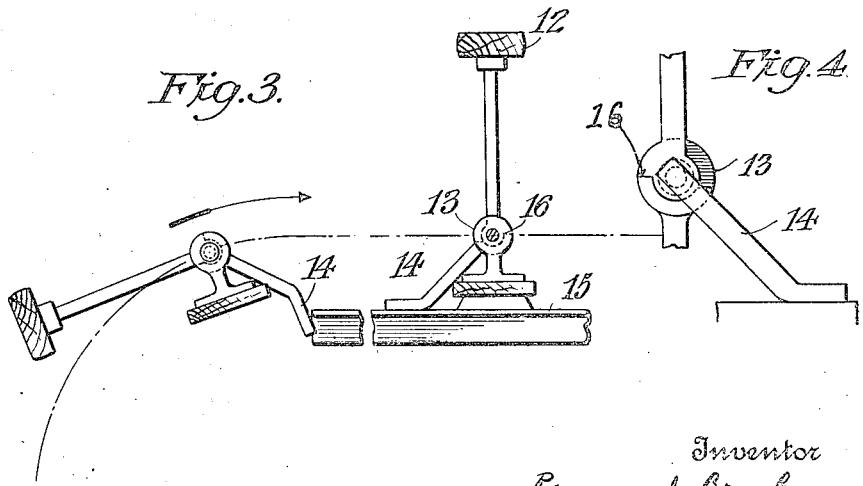

RAYMOND BROOKS, OF BENSON MINES, NEW YORK.

THEATER SEAT.

1,422,825.   Specification of Letters Patent.   Patented July 18, 1922.

Application filed March 11, 1920. Serial No. 364,948.

*To all whom it may concern:*

Be it known that I, RAYMOND BROOKS, a citizen of the United States, residing at Benson Mines, St. Lawrence County, New York, have invented new and useful Improvements in Theater Seats, of which the following is a specification, reference being had to the accompanying drawings, in which—

Fig. 1 is a front elevation, partly in section, of a row of seats constructed in accordance with my invention; Fig. 2 is a section on lines II—II of Fig. 1; Fig. 3 is a detail of the arm rest showing the manner in which it is brought into operative position; and Fig. 4 is a detail of the arm rest showing its connection to its support.

My invention relates to seats for theaters and the like and comprises a movable seat or row of seats by which a person or persons occupying such seat or seats may be permitted to move or be propelled in the direction of an exist aisle, thus leaving the seat or seats adjacent the entrance aisle ready to receive another person or persons. My invention is particularly applicable to motion picture or other continuous performance theaters. My invention also consists in the construction and arrangement of parts which I shall hereinafter describe and claim.

Referring to the drawings, 2 indicates the stationary back of a row of seats and 3 a seating surface, preferably divided in a number of parts pivotally supported at their ends upon two endless roller chains 4. The roller chains 4 are mounted on pairs of sprocket wheels 5, 5ᵃ. Each pair of wheels is mounted on a shaft 6, one of which is positioned at each end of the row of seats, and is actuated in any suitable manner. I have shown hand wheels 7 connected by chain drives 8 to gears 9 upon the shafts 6, by either of which the device may be operated. The roller chains 4 supporting the seating surface are moved along the rails 10 attached to the frame 11.

Arm rests 12 are provided which are pivoted upon base members 13, each of which is secured to a seating surface part 3. Each arm rest has a rearward and downward extension 14 which engages a bar 15 in the rear of the seating surface and is thereby moved into upright position and held against movement in one direction during the period of use. The shoulders 16 in the pivot prevent movement of the arms 12 in the opposite direction.

The ends of the row of seats are mounted in hoods 17 and 17ᵃ, which also cover the sprocket wheels 5, 5ᵃ.

The embodiment of my invention shown in the drawings is intended to be operated in a clock-wise direction, and I will now describe such operation.

Upon actuation of either of the hand wheels 7 the roller chains 4 are set in motion, thereby moving the seating surface 3. When the seating surface parts 3 are in normal seating position the rollers of the chains 4 are supported and moved along the rails 10 until the end of the row is reached and then they are carried around the sprocket 5ᵃ and travel underneath the position occupied by a seat in use and then around the sprocket wheel 5 back into position for use.

The arm rest 12 is maintained upright by the stops 16 and the engagement of its angled extension 14 with the bar 15. When the end of the bar 15 is reached the arm 12 is free to fall sideways upon the seating surface, and it does this as it strikes the inner surface of the hood 17ᵃ. As an arm 12 moves around the sprocket 5 its extension 14 comes into contact with the end of the bar 15 and is rotated about its pivot into upright position. The mechanism is covered by aprons 18.

My invention is of particular advantage in continuous performance theaters where the audience is arriving and departing at intermittent and irregular periods. In theaters equipped with ordinary seats the ushers have great difficulty in finding seats for and seating incoming patrons, while those departing usually have to crowd by other persons in the same row to reach the aisle, with the consequent disturbance to and distraction from the play of those remaining. With a theater equipped with my invention, all incoming persons can be made to use certain aisle or aisles, and the rows of seats can be made to operate in a direction away from such aisle or aisles. Then when an usher sees a row with several seats vacant he will cause the row to move in the direction of the exit aisle until the vacant places are on the side of the entrance aisle and the persons occupying the row have been moved along toward the exit aisle. In this manner vacant seats can be filled without discomfort to patrons already seated, and outgoing persons will usually find themselves near the outgoing aisle when they are ready to depart, and so can leave without inconveniencing others.

The parts of the seating surface 3 are shown as narrow and spaced apart so as to prevent the possibility of pinching the body, but any arrangement of seating surfaces may be made within the scope of my invention.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the invention claimed.

What I claim is:—

1. In seats for theaters and the like, a plurality of seating surfaces movable in a direction transverse to that in which the seats face, each seating surface being movable independently of the other seating surfaces away from an entrance aisle toward an exit aisle.

2. In seats for theaters and the like, a plurality of seating surfaces movable in a direction transverse to that in which the seats face, each seating surface being movable independently of the other seating surfaces, each seating surface being mounted on an endless conveyor and being movable when in operative position away from an entrance aisle toward an exit aisle, and when in inoperative position away from an exit aisle toward an entrance aisle.

3. In seats for theaters and the like, a series of seating surfaces, each for accommodation of a plurality of persons, movable in a direction transverse to that in which the seats face, each surface being mounted on rotatable members adapted upon actuation to carry said surface in a closed path into the position occupied by said surface in the first instance.

4. In a seat for theaters and the like, a seating surface movable in one direction, an endless conveyor upon which the surface is mounted, collapsible arm rests movable with the surface at spaced intervals, and supports upon which the endless conveyor is movable.

5. In a seat for theaters and the like, a seating surface movable in one direction, an endless conveyor upon which the surface is mounted, collapsible arm rests movable with the surface at spaced intervals, each arm rest having a pivotal mounting and an extension engaging a bar when the arm rest is in operative position, and supports upon which the endless conveyor is movable.

RAYMOND BROOKS.